United States Patent

Mishima et al.

[11] Patent Number: 5,990,240
[45] Date of Patent: Nov. 23, 1999

[54] RUBBER-CONTAINING RESIN COMPOSITION AND STYRENE RESIN COMPOSITION CONTAINING THE SAME

[75] Inventors: Ikuhiro Mishima, Kakogawa; Yo-ichi Matsumura, Takasago; Yoshihiko Hashimoto, Ibaraki; Shigemi Matsumoto, Akashi, all of Japan

[73] Assignee: Kaneka Corporation, Osaka, Japan

[21] Appl. No.: 08/893,556

[22] Filed: Jul. 11, 1997

[30] Foreign Application Priority Data

Jul. 12, 1996 [JP] Japan .................................. 8-183170

[51] Int. Cl.⁶ ........................................................ C08L 9/00
[52] U.S. Cl. ................................................................ 525/86
[58] Field of Search .................................................. 525/86

[56] References Cited

U.S. PATENT DOCUMENTS

| | | | |
|---|---|---|---|
| 4,430,478 | 2/1984 | Schmitt et al. | 525/71 |
| 4,657,974 | 4/1987 | Kushida | 525/86 |
| 4,755,559 | 7/1988 | Kishida et al. | 525/67 |
| 4,985,496 | 1/1991 | Kishida | 525/86 |
| 5,140,067 | 8/1992 | Tsuneshige | 525/86 |
| 5,202,379 | 4/1993 | Aoki et al. | 525/66 |
| 5,574,099 | 11/1996 | Noro | 525/84 |
| 5,605,963 | 2/1997 | Leitz | 525/86 |
| 5,610,235 | 3/1997 | Hiromoto et al. | 525/71 |
| 5,674,940 | 10/1997 | Eichenauer | 525/86 |
| 5,708,082 | 1/1998 | Huang | 525/86 |

FOREIGN PATENT DOCUMENTS

| | | |
|---|---|---|
| 0052732 A1 | 10/1981 | European Pat. Off. . |
| 0 390 081 | 10/1990 | European Pat. Off. . |
| 0 402 528 | 12/1990 | European Pat. Off. . |
| 0 430 876 A1 | 5/1991 | European Pat. Off. . |
| 0488930 A1 | 11/1991 | European Pat. Off. . |
| 0 488 932 | 6/1992 | European Pat. Off. . |
| 0 505 799 | 9/1992 | European Pat. Off. . |
| 63-191852 | 10/1988 | Japan . |
| 5-295051 | 5/1993 | Japan . |
| 8-59947 | 8/1996 | Japan . |
| WO 95/22570 | 8/1995 | WIPO . |

*Primary Examiner*—Paul R. Michl
*Attorney, Agent, or Firm*—Armstrong, Westerman, Hattori, McLeland & Naughton

[57] ABSTRACT

A rubber-containing resin composition suitable as an impact modifier for styrene resins (such as styrene homopolymer and copolymers and polymer alloys thereof with other thermoplastic resins), which comprises (A) a graft copolymer having a graft ratio of 10 to 80% by weight wherein a graft component comprising 15 to 60% by mole of at least one vinyl cyanide compound, 40 to 85% by mole of at least one aromatic vinyl compound and 0 to 30% by mole of at least one other monomer copolymerizable with them is graft-copolymerized onto a diene rubber having a volume average particle size of 100 to 1,000 nm by an emulsion polymerization method, and (B) an emulsion-polymerized copolymer of 15 to 60% by mole of at least one vinyl cyanide compound, 40 to 85% by mole of at least one aromatic vinyl compound and 0 to 30% by mole of at least one other monomer copolymerizable with them, which has a weight average molecular weight of 5,000 to 90,000 and a ratio of weight average molecular weight to number average molecular weight of 1.5 to 4.5, in which the ratio of the graft copolymer (A) to the copolymer (B) is from 50/50 to 95/5 by weight. A styrene resin composition comprising the rubber-containing resin composition and a styrene resin provides molded articles having excellent properties such as impact resistance, mechanical property, heat resistance and surface appearance with good processability.

24 Claims, No Drawings

RUBBER-CONTAINING RESIN COMPOSITION AND STYRENE RESIN COMPOSITION CONTAINING THE SAME

BACKGROUND OF THE INVENTION

The present invention relates to a rubber-containing resin composition and a styrene resin composition containing the rubber-containing resin composition. More particularly, the present invention relates to a styrene resin composition which can be suitably used for automobile interior materials such as pillar and instrument panel of automobiles, housings of household electric appliances such as electronic jar rice cooker and electronic oven, housings of office automation equipments such as telephone and facsimile machine, and others such as sundry goods, and to a rubber-containing resin composition used for preparing the styrene resin composition.

In order to improve mechanical properties such as impact resistance and properties such as surface appearance of rubber-modified styrene resins, it is known to mix a matrix of a styrene resin with an ABS resin having a high rubber content which comprises as a main component a graft copolymer wherein at least one monomer is graft-polymerized onto a rubber, in the form of a latex or a slurry. The graft copolymer can be uniformly dispersed into the styrene resin in this manner.

Also, in recent years, a process has been investigated for preparing a desired rubber-modified styrene resin by incorporating a powder of the high rubber content ABS resin into pellets or beads of the styrene resin matrix, from the viewpoints of productivity of rubber-modified styrene resins and convenience in control for producing various grades of the resins. However, this process has the disadvantage that when a powder of high rubber content ABS resin having a rubber content of about 40–80% by weight is used, the obtained rubber-modified styrene resins have impaired properties such as impact resistance, surface appearance and heat stability, since the styrene resin and the ABS resin must be melt-mixed at a high temperature in order to uniformly disperse the graft copolymer (ABS resin) into the styrene resin.

In order to eliminate this disadvantage, it is proposed to incorporate a polymer of an acrylic acid ester, a methacrylic acid ester or styrene to raise the dispersibility of the high rubber content ABS resin, thereby lowering the mixing temperature, as known from Japanese Patent Publication Kokai No. 57-5755. However, this proposal has the disadvantage that the impact resistance and heat resistance of the obtained rubber-modified styrene resin are impaired.

It is an object of the present invention to provide a rubber-modified styrene resin which can provide molded articles having excellent properties such as impact resistance, tensile strength, elongation, heat resistance, molding processability and surface appearance, in particular excellent impact resistance and surface appearance.

A further object of the present invention is to provide a rubber-containing resin composition suitable for incorporating into styrene resins to prepare a rubber-modified styrene resin having improved properties.

A still further object of the present invention is to provide a styrene resin composition containing the rubber-containing resin composition and having improved properties as mentioned above.

These and other objects of the present invention will become apparent from the description hereinafter.

SUMMARY OF THE INVENTION

In accordance with the present invention, there is provided a rubber-containing resin composition comprising:

(A) a graft copolymer having a graft ratio of 10 to 80% by weight wherein a graft component (Ag) comprising 15 to 60% by mole of at least one vinyl cyanide monomer, 40 to 85% by mole of at least one aromatic vinyl compound monomer and 0 to 30% by mole of at least one other monomer copolymerizable with these monomers is graft-copolymerized onto a diene rubber (Ad) having a volume average particle size of 100 to 1,000 nm by an emulsion polymerization method, and (B) an emulsion-polymerized copolymer of 15 to 60% by mole of at least one vinyl cyanide monomer, 40 to 85% by mole of at least one aromatic vinyl compound monomer and 0 to 30% by mole of at least one other monomer copolymerizable with these monomers, which has a weight average molecular weight (Mw) of 5,000 to 90,000 and an Mw/Mn ratio of weight average molecular weight (Mw) to number average molecular weight (Mn) of 1.5 to 4.5, in which the ratio of the graft copolymer (A) to the copolymer (B) is from 50/50 to 95/5 by weight.

The present invention also provides a styrene resin composition comprising the rubber-containing resin composition mentioned above and a styrene homopolymer or copolymer, which may further contain a vinyl chloride polymer, a polycarbonate, a polyamide or other thermoplastic resins to give rubber-modified styrene resin alloys.

DETAILED DESCRIPTION

The graft copolymer (A) used in the present invention is a graft copolymer having a graft ratio of 10 to 80% by weight wherein a graft component (Ag) comprising 15 to 60% by mole of at least one vinyl cyanide monomer, 40 to 85% by mole of at least one aromatic vinyl compound monomer and 0 to 30% by mole of at least one other monomer copolymerizable with these monomers is graft-copolymerized onto a diene rubber (Ad) having a volume average particle size of 100 to 1,000 nm by an emulsion polymerization method.

The diene rubber (Ad) serves to impart an impact resistance to styrene resins to be blended with the obtained rubber-containing resin composition. Examples of the diene rubber (Ad) are, for instance, butadiene rubber, styrene-butadiene rubber, acrylonitrile-butadiene rubber, butadiene-acrylic acid ester rubber, and the like. Butadiene rubber is preferred among them from the viewpoint of impact resistance.

From the viewpoint of impact resistance, it is preferable to use, as the diene rubber (Ad), a diene rubber having a particle size increased by agglomerating particles of a rubber of unenhanced particle size to form larger particles by means of (C) a latex of an acid group-containing copolymer prepared by copolymerizing (c) 5 to 50% by weight of at least one unsaturated carboxylic acid selected from the group consisting of acrylic acid, methacrylic acid, itaconic acid and crotonic acid, (d) 50 to 95% by weight of at least one alkyl (meth)acrylate having a $C_1$ to $C_{12}$ alkyl group and (e) 0 to 40% by weight of at least one monomer copolymerizable with the monomers (c) and (d). For instance, the acid group-containing copolymer latex (C) is added to a latex of the rubber of unenhanced particle size, thereby increasing the particle size of the rubber.

Diene rubbers as mentioned above can be used as the rubber of unenhanced particle size.

The unsaturated carboxylic acid (c) used in the preparation of the acid group-containing copolymer latex (C) is at least one member selected from the group consisting of acrylic acid, methacrylic acid, itaconic acid and crotonic acid. Acrylic acid is particularly preferred from the viewpoints of particle size enhancing property and improvement of impact resistance. The particle size enhancing property is estimated based on the easiness in controlling the particle size in the size increasing procedure and the amount of agglomerates formed.

The amount of the unsaturated carboxylic acid (c) in the acid group-containing copolymer is at least 5% by weight, preferably at least 7% by weight, from the viewpoint of the particle size enhancing property, particularly the easiness in particle size control, and is at most 50% by weight, preferably at most 40% by weight, from the viewpoint of the particle size enhancing property, particularly the amount of agglomerates formed.

Examples of the alkyl (meth)acrylate (d) having a $C_1$ to $C_{12}$ alkyl group used in the preparation of the acid group-containing copolymer latex (C) are, for instance, methyl methacrylate, ethyl methacrylate, propyl methacrylate, butyl methacrylate, 2-ethylhexyl methacrylate, methyl acrylate, ethyl acrylate, propyl acrylate, butyl acrylate, 2-ethylhexyl acrylate, and the like.

The amount of the alkyl (meth)acrylate (d) in the acid group-containing copolymer is at least 50% by weight, preferably at least 60% weight, from the viewpoint of the particle size enhancing property, and is at most 95% by weight, preferably at most 93% by weight, from the viewpoint of the particle size enhancing property.

The monomer (e) copolymerizable with the unsaturated carboxylic acid (c) and the alkyl (meth)acrylate (d) includes, for instance, an aromatic vinyl compound, a vinyl cyanide compound, a compound having at least two polymerizable groups in its molecule, and the like. Examples of the aromatic vinyl compound are, for instance, styrene, α-methylstyrene, and other known styrene derivatives, e.g. alkylstyrenes such as p-methylstyrene and halostyrenes such as p-chlorostyrenene. The aromatic vinyl compounds may be used alone or in admixture thereof. Examples of the vinyl cyanide compound are, for instance, acrylonitrile, methacrylonitrile, and the like. The vinyl cyanide compounds may be used alone or in admixture thereof. Examples of the compound having at least two polymerizable groups are, for instance, divinyl benzene, allyl acrylate, allyl methacrylate, triallyl isocyanurate, diallyl phthalate, and the like. The compounds having at least two polymerizable groups may be used alone or in admixture thereof.

The amount of the copolymerizable monomer (e) in the copolymer is at most 40% by weight, preferably at most 20% by weight, from the viewpoint of the particle size enhancing property.

As the acid group-containing copolymer latex (C), particularly preferred is a latex of an acid group-containing copolymer prepared by copolymerizing (c) 5 to 25% by weight of at least one unsaturated carboxylic acid selected from the group consisting of acrylic acid, methacrylic acid, itaconic acid and crotonic acid, (d-1) 5 to 30% by weight of an alkyl acrylate having a $C_1$ to $C_{12}$ alkyl group, (d-2) 20 to 90% by weight of an alkyl methacrylate having a $C_1$ to $C_{12}$ alkyl group, and (e) 0 to 40% by weight of a monomer copolymerizable with the monomers (c), (d-1) and (d-2) selected from the group consisting of an aromatic vinyl compound, a vinyl cyanide compound and a compound having at least two polymerizable groups in its molecule, wherein the total amount of the monomers (d-1) and (d-2) is from 50 to 95% by weight based on the whole monomers used.

In this preferable acid group-containing copolymer latex (C), the unsaturated carboxylic acid (c) is used in an amount of at least 5% by weight, preferably at least 7% by weight, and at most 25% by weight, preferably at most 23% by weight, from the viewpoint of good particle size enhancing property. A mixture of the alkyl acrylate and the alkyl methacrylate is used as the component (d). The amount of the alkyl acrylate (d-1) is at least 5% by weight, preferably at least 8% by weight, from the viewpoint of the particle size enhancing property, particularly easiness in particle size control, and is at most 30% by weight, preferably at most 28% by weight, from the viewpoint of the particle size enhancing property, particularly the amount of agglomerates formed. The amount of the alkyl methacrylate (d-2) is at least 20% by weight, preferably at least 45% by weight, and is at most 90% by weight, preferably at most 85% by weight, from the viewpoint of the particle size enhancing property. The copolymerizable monomer (e) is used in an amount of at most 40% by weight, preferably at most 20% by weight, from the viewpoint of the particle size enhancing property.

In the preparation of the particle size enhanced diene rubber, the starting diene rubber of unenhanced particle size is preferably used in the form of an aqueous latex.

It is preferable from the viewpoints of impact resistance and production stability to use the acid group-containing copolymer latex (C) in an amount of 0.1 to 15 parts by weight in terms of solid matter based on 100 parts by weight of the diene rubber (solid matter) of unenhanced particle size.

The size increasing operation using the acid group-containing copolymer latex (C) is carried out, for instance, by mixing the diene rubber latex of unenhanced particle size with the acid group-containing copolymer latex (C) in a predetermined ratio, and stirring the resulting mixture at an elevated temperature, e.g. at a temperature of 40 to 80° C., for about one hour or more, thereby agglomerating the rubber particles to a desired volume average particle size.

In order to sufficiently impart an impact resistance to styrene-based resins, the volume average particle size of the diene rubber (Ad) used in the preparation of the graft copolymer (A) is at least 100 nm, preferably at least 200 nm, and is at most 1,000 nm, preferably at most 900 nm, more preferably at most 800 nm.

The term "volume average particle size" as used herein means a value of particle size of a rubber latex measured by an optical particle size analyzer for latex, or a value obtained by observing a rubber in the solid form with an electron microscope and making an image analysis treatment.

The graft copolymer (A) used in the present invention is prepared by graft-copolymerizing the graft component (Ag) onto the diene rubber (Ad) as mentioned above in an emulsion polymerization manner. The graft component (Ag) comprises 15 to 60% by mole of at least one vinyl cyanide monomer, 40 to 85% by mole of at least one aromatic vinyl monomer and 0 to 30% by mole of at least one other monomer copolymerizable with these vinyl monomers.

Examples of the vinyl cyanide monomer are, for instance, acrylonitrile, methacrylonitrile, and the like. The vinyl cyanide monomers may be used alone or in admixture thereof. Acrylonitrile is preferred from an industrial point of view. The amount of the vinyl cyanide monomer in the graft component (Ag) is at least 15% by mole, preferably at least 20% by mole, from the viewpoint of improvement in heat resistance, and is at most 60% by mole, preferably at most 55% by mole, from the viewpoint of improvement in processability.

Examples of the aromatic vinyl monomer are, for instance, styrene, α-methylstyrene, p-methylstyrene, chlorostyrene, bromostyrene, vinyl naphthalene, and the like. The aromatic vinyl monomers may be used alone or in admixture thereof. Styrene is preferred from an industrial point of view. The amount of the aromatic vinyl monomer in the graft component (Ag) is at least 40% by mole, preferably at least 45% by mole, from the viewpoint of improvement in processability, and is at most 85% by mole, preferably at most 80% by mole, from the viewpoint of improvement in heat resistance.

Examples of the other monomers copolymerizable with the vinyl cyanide monomer and the aromatic vinyl monomer are, for instance, (meth)acrylic acid; (meth)acrylic acid esters, e.g., an alkyl (meth)acrylate such as methyl (meth) acrylate, ethyl (meth)acrylate, propyl (meth)acrylate, butyl (meth)acrylate, 2-hydroxyethyl (meth)acrylate or 2-ethylhexyl (meth)acrylate, and glycidyl (meth)acrylate; maleimide compounds such as maleimide, N-methylmaleimide, N-ethyl-maleimide, N-propylmaleimide, N-butylmaleimide, N-phenyl-maleimide and N-(p-methylphenyl)maleimide; and the like. The copolymerizable other monomers may be used alone or in admixture thereof. The amount of the copolymerizable other monomers in the graft component (Ag) is at most 30% by mole, preferably at most 20% by mole, from the viewpoint of improvement in impact resistance.

The graft copolymerization can be carried out in any known emulsion polymerization manners.

The graft ratio of the graft copolymers (A) is obtained by the following equation.

$$\text{Graft ratio (\% by weight)} = \frac{\text{Weight of graft component (Ag)}}{\text{Weight of diene rubber (Ad)}} \times 100$$

The graft ratio of the graft copolymer (A) is at least 10% by weight, preferably at least 15% by weight, from the viewpoint of improvement in impact resistance, and is at most 80% by weight, preferably at most 75% by weight, more preferably at most 60% by weight, from the viewpoint of improvement in surface appearance and processability.

The (A)/(B) weight ratio of the graft copolymer (A) to the copolymer (B) is at least 50/50, preferably at least 55/45, more preferably at least 60/40, in order to impart a sufficient impact resistance to styrene-based resins, and is at most 95/5, preferably at most 90/10, more preferably at most 85/15, from the viewpoint of surface appearance.

From the viewpoints of impact resistance, surface appearance, tensile strength and flexural strength, it is preferable that the graft copolymer (A) and the copolymer (B) are uniformly mixed in the form of a latex.

The thus obtained rubber-containing resin composition of the present invention comprising the graft copolymer (A) and the copolymer (B) has a content of the diene rubber (Ad) of 40 to 85% by weight, especially 40 to 80% by weight, from the viewpoints of productivity and convenience.

The graft copolymerization may produce, in addition to the graft copolymer (A), a free copolymer of to 60% by mole of the vinyl cyanide monomer, 40 to 85% by mole of the aromatic vinyl monomer and 0 to 30% by mole of the other copolymerizable monomers.

Thus, the copolymer (B) may be a copolymer (Bg) by-produced in the graft copolymerization, a copolymer (Bf) separately produced, or a mixture thereof.

If a large amount of a monomer mixture for the graft component (Ag) is used upon the preparation of the graft copolymer (A) and is graft-polymerized with controlling polymerization conditions such as polymerization initiator, chain transfer agent, emulsifier, polymerization temperature, amount of water, manner of adding monomers and the like to produce a sufficient amount of the free copolymer (Bg) so as to satisfy the above-mentioned (A)/(B) ratio, it is not necessary to prepare and use the copolymer (Bf) separately. If the amount of the by-produced copolymer (Bg) is so small as not to satisfy the (A)/(B) ratio, or if it is desired to raise the proportion of the copolymer (B), the copolymer (Bf) may be prepared separately and used in combination with the copolymer (Bg).

The copolymer (Bf) can be prepared by emulsion polymerization of 15 to 60% by mole of at least one vinyl cyanide monomer, 40 to 85% by mole of at least one aromatic vinyl monomer and 0 to 30% by mole of at least one other monomer copolymerizable with these vinyl monomers. The kinds and amounts of the vinyl cyanide monomer, aromatic vinyl monomer and other copolymerizable monomer used for the copolymer (Bf) are the same as those explained above for the graft copolymer (Ag).

The molecular weight of the copolymer (B) affects the impact resistance and surface appearance of the rubber-containing resin composition. The copolymer (B) used in the present invention has a weight average molecular weight (Mw) (in terms of polystyrene, hereinafter the same) of at least 5,000, preferably at least 10,000, more preferably at least 15,000, from the viewpoint of impact resistance, and is at most 90,000, preferably at most 85,000, more preferably at most 80,000, from the viewpoint of surface appearance.

Also, the copolymer (B) should be such that the Mw/Mn ratio of the weight average molecular weight (Mw) to the number average molecular weight (Mn) is at least 1.5, preferably at least 1.8, more preferably at least 2.0, from the viewpoint of processability, and is at most 4.5, preferably at most 4.2, more preferably at most 4.0, from the viewpoint of impact resistance.

It is necessary that the graft copolymer (A) and the copolymer (B) both are prepared by an emulsion polymerization method. In case of bulk polymerization, suspension polymerization and solution polymerization, it becomes difficult to control the graft ratio of the graft copolymer (A) and the molecular weight of the copolymer (B) within the predetermined ranges when the diene rubber content is raised.

Any of the known polymerization initiators can be used as the polymierization initiator for preparing the graft copolymer (A) and the copolymer (B), e.g., a thermal decomposable initiator such as potassium persulfate, and a redox initiator such as Fe-reducing agent-organic peroxide.

A chain transfer agent such as t-dodecylmercaptan, n-dodecylmercaptan, α-methylstyrene dimer or terpinolene can be used in the emulsion polymerization so long as the graft ratio can be controlled.

Known emulsifiers can be used in the emulsion polymerization, e.g., a metal salt of rosin acid such as rosin acid potassium salt or rosin acid sodium salt, a metal salt of a higher fatty acid such as sodium palmitate or sodium oleate, and a sodium sulfonate such as sodium dodecylbenzenesulfonate, sodium palmitylsulfonate or sodium dioctylsulfosuccinate.

In the emulsion polymerization, a monomer mixture may be added at one time or continuously to a polymerization system and is polymerized under generation of radicals. In case of the preparation of the graft copolymer (A), the polymerization is carried out in the presence of the diene rubber (Ad).

In order to control exactly the graft ratio of the graft copolymer (A) and the molecular weight of the copolymer (B), it is preferable to prepare the graft copolymer (A) and the copolymer (B) separately from each other and then to mix them.

Recovery of the rubber-containing resin composition of the present invention in the form of a powder from an aqueous latex containing the graft copolymer (A) and the non-graft copolymer (B) can be carried out in a usual manner, for instance, by adding an alkaline earth metal salt such as calcium chloride, magnesium chloride or magnesium sulfate, an alkali metal salt such as sodium chloride or sodium sulfate, an inorganic acid such as hydrochloric acid, sulfuric acid or phosphoric acid, or an organic acid such as acetic acid to the latex to coagulate it, and thereafter subjecting the coagulated latex to heat treatment, dehydration and drying, spray drying or the like.

Upon the recovery, a stabilizer, a lubricant or other desired additives can be incorporated in order to prevent or control the deterioration, flowability and storage characteristics of the powder and to cause the properties of rubber-modified styrene resin compositions to be exhibited more readily.

Examples of the stabilizer are, for instance, hindered phenol stabilizers, sulfur stabilizer, phosphorus stabilizer and the like which have been generally used in rubber-modified styrene resins. Examples of the lubricant are, for instance, a higher fatty acid bisamide, a higher fatty acid amide, an ester of a higher fatty acid and a higher alcohol, an ester of a higher fatty acid and a polyhydric alcohol, a higher fatty acid metal salt, a higher alcohol, an olefin wax, and the like. The stabilizer, lubricant and the like may be added to the rubber-containing resin composition as they are, namely, in the form of a powder, but are preferably added in a finely dispersed form, for instance, in the form of emulsion or slurry, to a latex or slurry of the rubber-containing resin composition in order for the effects produced thereby to be exhibited more readily.

The rubber-containing resin composition of the present invention is very useful as a modifier for styrene resins.

Examples of the styrene resins to which the rubber-containing resin composition of the present invention is applicable are, for instance, polystyrene; copolymers of styrene or styrene derivative with other copolymerizable monomer such as a vinyl monomer, e.g., acrylonitrile-styrene copolymer, acrylonitrile-styrene-α-methylstyrene copolymer, acrylonitrile-α-methylstyrene copolymer, acrylonitrile-styrene-phenylmaleimide copolymer, acrylonitrile-styrene-α-methylstyrene-phenylmaleimide copolymer, styrene-phenylmaleimide copolymer, styrene-maleic anhydride copolymer, styrene-methyl methacrylate copolymer and other known styrene-based copolymers; styrene-based resin alloys, e.g., alloys of a styrene resin and other thermoplastic resins such as polycarbonate/acrylonitrile-styrene copolymer alloy, polycarbonate/acrylonitrile-α-methylstyrene-styrene copolymer alloy, polyamide/acrylonitrile-styrene copolymer alloy, polyamide/acrylonitrile-α-methylstyrene-styrene copolymer alloy, polyvinyl chloride/acrylonitrile-styrene copolymer alloy and polyvinyl chloride/acrylonitrile-α-methylstyrene-styrene copolymer alloy. The content of the styrene and/or styrene derivative in the copolymers is at least 30% by weight, preferably at least 40% by weight, more preferably at least 45% by weight. The content of the styrene homopolymer and/or copolymer in the alloys is at least 20% by weight and at most 80% by weight, preferably from 25 to 75% by weight, more preferably from to 70% by weight, from the view-point of processability.

Thus, the present invention provides a rubber-modified styrene resin composition comprising the rubber-containing resin composition and a styrene resin such as polystyrene and styrene copolymers as exemplified above.

The present invention also provides various rubber-modified styrene resin alloys such as a rubber-modified vinyl chloride resin/styrene resin alloy, a rubber-modified polycarbonate/styrene resin alloy and a rubber-modified polyamide/styrene resin alloy.

The rubber-modified vinyl chloride resin/styrene resin alloy according to the present invention comprises the rubber-containing resin composition mentioned above, a styrene copolymer as exemplified above and a vinyl chloride resin. The vinyl chloride resin includes vinyl chloride homopolymer and vinyl chloride copolymers composed of vinyl chloride as a main component.

The rubber-modified polycarbonate/styrene resin alloy according to the present invention comprises the rubber-containing resin composition mentioned above, a styrene copolymer as exemplified above and a polycarbonate. The polycarbonate includes, for instance, a bisphenol A-type aromatic polycarbonate.

The rubber-modified polyamide/styrene resin alloy according to the present invention comprises the rubber-containing resin composition mentioned above, a styrene copolymer as exemplified above and a polyamide. Examples of the polyamide are, for instance, nylon 6, nylon 66, nylon 12, and the like.

Preferably, the rubber-containing resin composition of the present invention is used in an amount of at least 5 parts by weight, especially at least 10 parts by weight, so as to impart an impact resistance to a styrene resin, and at most 60 parts by weight, especially at most 50 parts by weight, so as not to lower the processability, based on 100 parts by weight of a styrene resin, namely, 100 parts by weight of a styrene homopolymer or copolymer, 100 parts by weight of the total of a styrene homopolymer or copolymer and a vinyl chloride resin, 100 parts by weight of the total of a styrene homopolymer or copolymer and a polycarbonate, or 100 parts by weight of the total of a styrene homopolymer or copolymer and a polyamide.

The rubber-modified styrene resin composition of the present invention is prepared by melt-mixing the rubber-containing resin composition of the present invention and a styrene resin in a kneader or other appropriate mixing machine.

The styrene resin composition may contain usual additives such as a colorant, a filler and the like, as occasion demands.

The styrene resin composition can be molded into desired shapes by a usual molding method such as injection molding, extrusion or compression molding. The obtained molded articles have excellent properties such as improved impact resistance and surface appearance, and are very suitable for sundry goods, interior materials of automobiles, housings of household electric appliances and office automation equipments, and the like.

The present invention is more specifically described and explained by means of the following Examples. It is to be understood that the present invention is not limited to these Examples.

REFERENCE EXAMPLE 1

Preparation of Diene Rubber (Ad)

In the first step, a diene rubber of unenhanced particle size was prepared as follows:

A 100 liter polymerization reactor was charged with 34,500 g of pure water, 30 g of potassium persulfate and 30 g of t-dodecylmercaptan. After evacuating the reactor to less than 100 mmHg by a vacuum pump, 75 g of sodium oleate, 300 g of sodium salt of rosin acid and 15,000 g of butadiene were added to the reactor, and the temperature of the polymerization system was elevated to 60° C. to initiate the polymerization. The polymerization was carried out at that temperature for 25 hours. The polymerization conversion was 96% by weight.

The diene rubber in the obtained aqueous latex had a volume average particle size of 85 nm Herein, the polymerization conversion was measured by gas chromatography, and the volume average particle size was measured by using a NICOMP Model 370 Submicron Particle Sizer made by Pacific Science Instrument Division.

In the second stage, an acid group-containing copolymer latex (C) used for agglomerating the diene rubber particles to increase the particle size of the aqueous diene rubber latex obtained in the first stage was prepared as follows:

An 8 liter reactor equipped with a stirrer, a reflux condenser, an inlet for introducing nitrogen gas, an inlet for introducing monomers and a thermometer was charged with 4,000 g of pure water, 12 g of sodium dioctylsulfosuccinate, 10 g of formaldehyde sodium sulfoxylate, 0.2 g of disodium ethylenediaminetetraacetate and 0.05 g of ferrous sulfate. After elevating the temperature to 70° C. in a nitrogen gas stream with stirring, a mixture of 500 g of butyl methacrylate, 100 g of butyl acrylate, 2 g of t-dodecylmercaptan and 3 g of cumene hydroperoxide was added dropwise to the reactor over 2 hours, and subsequently a mixture of 1,000 g of butyl methacrylate, 80 g of butyl acryalte, 320 g of methacrylic acid, 10 g of t-dodecylmercaptan and 3 g of cumene hydroperoxide was added dropwise to the reactor over 4 hours. After the completion of the addition, the reaction mixture was further stirred at 70° C. for 1 hour to give an acid group-containing copolymer latex (C). The polymerization conversion was 99% by weight.

In the third stage, 70 g (solid matter) of the thus obtained acid group-containing copolymer latex (C) was added to 2,000 g (solid matter) of the diene rubber latex obtained in the first stage at 60° C. The resulting mixture was stirred at that temperature for 1 hour to give a diene rubber (Ad-I) having an increased particle size.

The obtained diene rubber (Ad-I) had a volume average particle size of 450 nm.

REFERENCE EXAMPLE 2

Preparation of Diene Rubber (Ad)

The procedure of Reference Example 1 was repeated except that 40 g (solid matter) of the acid group-containing copolymer latex (C) was added to 2,000 g (solid matter) of the diene rubber latex of unenhanced particle size at 60° C., and the resulting mixture was stirred at that temperature for 1 hour to give a size-increased diene rubber (Ad-II).

The obtained diene rubber (Ad-II) had a volume average particle size of 620 nm.

PREPARATION EXAMPLE 1

Preparation of Graft Copolymer (A-I)

An 8 liter reactor equipped with a stirrer, a reflux condenser, an inlet for introducing nitrogen gas, an inlet for introducing monomers and a thermometer was charged with 5,600 g of pure water, 1,500 g (solid matter) of the diene rubber (Ad-I) obtained in Reference Example 1, 6 g of formaldehyde sodium sulfoxylate, 2 g of disodium ethylenediaminetetraacetate and 0.05 g of ferrous sulfate. After elevating the temperature to 60° C. in a nitrogen gas stream, a mixture of 126 g of acrylonitrile, 374 g of styrene and 4 g of cumene hydroperoxide was added dropwise continuously to the reactor over 5 hours with stirring. After the completion of the addition, the reaction mixture was further stirred at 60° C. for 2 hours to give an aqueous latex of a graft copolymer (A-I).

The polymerization conversion and graft ratio of the obtained graft copolymer (A-I) were measured according to the following methods.

(Polymerization conversion)

The polymerization conversion was measured by gas chromatography.

(Graft ratio)

In 100 ml of methyl ethyl ketone was dissolved 1 g of a powder of graft copolymer (A), and the resulting solution was centrifuged into a methyl ethyl ketone-soluble portion, i.e. non-graft copolymer (Bg), and a methyl ethyl ketone-insoluble portion, i.e. graft copolymer (A). Methanol was added to the methyl ethyl ketone-soluble portion to precipitate the non-graft copolymer (Bg). The graft ratio was calculated according to the equation described above based on the amounts of the graft copolymer (A) in the insoluble portion and the non-graft copolymer (Bg) and the polymerization conversion.

The results are shown in Table 1.

The copolymer (Bg) by-produced in this Preparation Example 1 is hereinafter referred to as "copolymer (Bg-I)".

The weight ratio of the graft copolymer (A-I) to the non-graft copolymer (Bg-I) was 94/6.

The composition of the graft component (Ag) grafted onto the diene rubber in the obtained graft copolymer (A-I) was measured by CHN analysis. The results are shown in Table 1.

PREPARATION EXAMPLES 2 TO 5

Preparation of Graft Copolymers (A-II) to (A-V)

Latices of graft copolymer (A) were prepared in the same manner as in Preparation Example 1 except that the kinds and amounts of the diene rubber (Ad) and graft component (Ag) charged were changed as shown in Table 1.

The polymerization conversion, weight ratio of graft copolymer (A) to copolymer (B), graft ratio of graft copolymer (A) and composition of graft component (Ag) were measured in the same manner as in Preparation Example 1.

The results are shown in Table 1.

The non-graft copolymers (Bg) by-produced in Preparation Examples 2 to 5 are hereinafter referred to as "copolymers (Bg-II), (Bg-III), (Bg-IV) and (Bg-V)", respectively.

PREPARATION EXAMPLE 6

Preparation of Graft Copolymer (A-VI)

A latex of graft copolymer (A) was prepared in the same manner as in Preparation Example 1 except that 1,760 g of a diene rubber (Ad-3) commercially available under the trade mark "NIPOL 111NF" made by Nippon Zeon Co., Ltd. (volume average particle size 350 nm) was used instead of 1,500 g of the diene rubber (Ad-I) obtained in Reference Example 1, and the amount of the graft component (Ag) charged was changed as shown in Table 1.

The results are shown in Table 1.

TABLE 1

| Pre. Ex. No. | Diene rubber (Ad) | Graft component (Ag) | | | | | Polymerization conversion (% by weight) | Graft ratio (% by wt.) | Composition of graft component (% by mole) | | | Identification | Weight ratio of graft copolymer (A) to non-graft copolymer (Bg) |
|---|---|---|---|---|---|---|---|---|---|---|---|---|---|
| | | AN*1 | St*2 | BA*3 | Peroxide*4 | Mercaptan*5 | | | AN | St | BA | | |
| 1 | Ad-I 1500 | 126 | 374 | — | 4 | — | 98 | 24 | 40 | 60 | — | A-I | 94/6 |
| 2 | Ad-I 1300 | 176 | 524 | — | 6 | — | 99 | 43 | 40 | 60 | — | A-II | 93/7 |
| 3 | Ad-II 1500 | 150 | 320 | 30 | 4 | — | 98 | 25 | 46 | 50 | 4 | A-III | 94/6 |
| 4 | Ad-I 1100 | 226 | 674 | — | 20 | 8 | 98 | 19 | 40 | 60 | — | A-IV | 78/22 |
| 5 | Ad-I 800 | 300 | 900 | — | 10 | — | 98 | 105 | 40 | 60 | — | A-V | 83/17 |
| 6 | Ad-3 1760 | 60 | 180 | — | 4 | — | 98 | 7 | 46 | 60 | — | A-VI | 83/17 |

(Notes)
*1AN: Acrylonitrile
*2St: Styrene
*3BA: Butyl acrylate
*4Peroxide: Cumene hydroperoxide
*5Mercaptan: t-Dodecylmercaptan

PREPARATION EXAMPLE 7

Preparation of Non-graft Copolymer (Bf-I)

An 8 liter reactor equipped with a stirrer, a reflux condenser, an inlet for introducing nitrogen gas, an inlet for introducing monomers and a thermometer was charged with 5,000 g of pure water, 20 g of sodium dioctylsulfosuccinate, 10 g of formaldehyde sodium sulfoxylate, 0.2 g of disodium ethylenediaminetetraacetate and 0.05 g of ferrous sulfate.

After elevating the temperature to 65° C. in a nitrogen gas stream, a mixture of 520 g of acrylonitrile, 1,480 g of styrene, 18 g of t-dodecylmercaptan and 4 g of cumene hydroperoxide was added dropwise continuously to the reactor over 7 hours with stirring. Also, 10 g portions of sodium dioctylsulfosuccinate were added 1 hour and 3 hours after starting the polymerization. After the completion of the addition, the reaction mixture was further stirred at 65° C. for 1 hour to give an aqueous latex of a copolymer (Bf-I).

The polymerization conversion is shown in Table 2.

PREPARATION EXAMPLES 8 TO 10

Preparation of Copolymers (Bf-II) to (Bf-IV)

The procedure of Preparation Example 7 was repeated except that the composition of the monomers charged was changed as shown in Table 2 to give a latex of copolymer (Bf).

The results are shown in Table 2.

TABLE 2

| Preparation Example No. | Composition of monomers charged for copolymer (Bf) (g) | | | | | Polymerization conversion (% by weight) | Identification of copolymer (B) |
|---|---|---|---|---|---|---|---|
| | Acrylonitrile | Styrene | Butyl acrylate | Cumene hydroperoxide | t-Dodecyl-mercaptan | | |
| 7 | 520 | 1480 | — | 4 | 18 | 99 | Bf-I |
| 8 | 480 | 1520 | — | 4 | 14 | 98 | Bf-II |
| 9 | 600 | 1300 | 100 | 4 | 50 | 98 | Bf-III |
| 10 | 500 | 1500 | — | 4 | 5 | 99 | Bf-IV |

EXAMPLES 1 TO 7 AND COMPARATIVE EXAMPLES 1 TO 3

Each of the aqueous latices of graft copolymers (A-I) to (A-VI) obtained in Preparation Examples 1 to 6 was mixed with each of the aqueous latices of copolymers (Bf-I) to (Bf-IV) obtained in Preparation Examples 7 to 10 in a ratio shown in Table 3. To the resulting mixture was added 1 part by weight of a hindered phenol stabilizer. After thoroughly stirring the mixture, 0.5 part by weight of hydrochloric acid was added to the mixture to coagulate the latex. The thus obtained coagulated slurry was heat-treated by blowing steam at 96° C. for 5 minutes, dehydrated and dried to give a rubber-containing resin composition.

The composition, weight average molecular weight (Mw) and Mw/Mn ratio of weight average molecular weight (Mw)

to number average molecular weight (Mn) of a copolymer (B) included in the obtained rubber-containing resin compositions were measured by the following methods.

Composition, Mw and Mw/Mn ratio of copolymer (B)

In 100 ml of methyl ethyl ketone was dissolved 1 g of powder of the rubber-containing resin composition, and the resulting solution was centrifuged into a soluble portion and an insoluble portion. Methanol was added to the methyl ethyl ketone-soluble portion to precipitate the copolymer (B) (copolymer B containing the copolymer Bg and/or Bf).

The composition of the copolymer (B) was determined by CHN analysis. Also, the Mw and Mw/Mn ratio of the copolymer (B) were measured by gel permeation chromatography using standard polystyrene. The results are shown in Table 3.

fluidity of the styrene resin composition were evaluated using the obtained pellets and test specimens by the following methods.

The results are shown in Table 4.

(Impact resistance)

Izod impact strength was measured at 23° C. according to ASTM D-256 (notched, ¼ inch thickness).

(Tensile strength and elongation)

Tensile strength and tensile elongation were measured at 23° C. using No. 1 dumbbell specimens according to ASTM D-638.

(Flexural strength and flexural elasticity)

Flexural strength and flexural elasticity were measured at 23° C. according to ASTM D-790.

TABLE 3

| | Composition of rubber-containing resin composition (parts by weight) | | | | | Copolymer (B) | | | | |
|---|---|---|---|---|---|---|---|---|---|---|
| | Graft copolymer | | | | | Composition (% by mole) | | | Weight average | Mw/Mn | Identification of |
| | (A) | | Copolymer (Bg) | Copolymer (Bf) | | AN*1 | St*2 | BA*3 | molecular weight Mw | ratio | resin compostion |
| Ex. 1 | (A-I) | 64 | (Bg-I) 4 | (Bf-I) | 32 | 40 | 60 | — | 51000 | 2.2 | E-I |
| Ex. 2 | (A-II) | 73 | (Bg-II) 6 | (Bf-I) | 21 | 40 | 60 | — | 52000 | 2.2 | E-II |
| Ex. 3 | (A-III) | 65 | (Bg-III) 4 | (Bf-I) | 31 | 41 | 58 | 1 | 50000 | 2.2 | E-III |
| Ex. 4 | (A-IV) | 78 | (Bg-IV) 22 | — | | 40 | 60 | — | 74000 | 3.6 | E-IV |
| Ex. 5 | (A-I) | 64 | (Bg-I) 4 | (Bf-II) | 32 | 38 | 62 | — | 71000 | 2.1 | E-V |
| Ex. 6 | (A-I) | 64 | (Bg-I) 4 | (Bf-III) | 32 | 45 | 52 | 3 | 22000 | 2.5 | E-VI |
| Ex. 7 | (A-I) | 75 | (Bg-I) 5 | (Bf-I) | 20 | 40 | 60 | — | 50000 | 2.2 | E-VII |
| Com. Ex. 1 | (A-V) | 83 | (Bg-IV) 17 | — | | 40 | 60 | — | 90000 | 2.8 | C-I |
| Com. Ex. 2 | (A-VI) | 55 | (Bg-VI) 4 | (Bf-I) | 41 | 40 | 60 | — | 82000 | 3.1 | C-II |
| Com. Ex. 3 | (A-I) | 64 | (Bg-I) 4 | (Bf-IV) | 32 | 40 | 60 | — | 140000 | 2.8 | C-III |

(Notes)
*1An: Acrylonitrile
*2St: Styrene
*3BA: Butyl acrylate

EXAMPLES 8 TO 15 AND COMPARATIVE EXAMPLES 4 TO 7

The rubber-containing resin composition obtained in Examples 1 to 7 or Comparative Examples 1 to 3, a styrene resin (copolymer of 30% by weight of acrylonitrile and 70% by weight of styrene having a weight average molecular weight of 150,000) and ethylenebisstearylamide were charged into a blender (model 201 made by Tabata Kikai Kogyo Kabushiki Kaisha) and mixed at room temperature to give a uniform mixture.

The obtained mixture was placed in a 40 mm single screw extruder (40 mm vent type extruder made by Tabata Kikai Kogyo Kabushiki Kaisha), melt-kneaded at 230° C. and extruded to pellets of a styrene resin composition having a size of 2 mm diameter and 5 mm length.

Also, the obtained styrene resin composition was supplied to an injection molding machine (model FAS100B made by Fanuc Kabushiki Kaisha) and molded at 230° C. to give test specimens (ASTM standard size).

The impact resistance, tensile strength, tensile elongation, flexural strength, heat resistance, surface appearance and (Heat resistance)

Heat distortion temperature was measured under a load of 18.6 kg/cm$^2$ according to ASTM D-648.

(Surface appearance)

A styrene resin composition was extruded into a strand for pelletization by the above-mentioned single screw extruder, and the strand was visually observed and evaluated according to the following ratings.

Evaluation ratings
5: Having a gloss and no fish eye
4: Having a gloss and a few fish eyes
3: Having a gloss and some fish eyes
2: Having a gloss and many fish eyes
1: Having little gloss and a great many fish eyes (Fluidity)

A styrene resin composition was supplied to an injection molding machine (model FAS100B made by Fanuc Kabushiki Kaisha) and injected at a cylinder temperature of 230° C. and an injection pressure of 1,350 kg/cm$^2$ into a spiral mold having a thickness of 3 mm, and the flow length of the resin in the mold was measured.

TABLE 4

| | Composition of styrene resin composition (part by weight) | | | Property of stryene resin composition | | | | | | | |
|---|---|---|---|---|---|---|---|---|---|---|---|
| | Rubber-containing resin composition | Styrene resin | Lubricant*1 | Impact resistance (kg · cm/cm) | Tensile strength (kg/cm$^2$) | Elongation (%) | Flexural strength (kg/cm$^2$) | Flexural elasticity (kg/cm$^2$) | Heat resistance (° C.) | Surface appearance | Fluidity (mm) |
| Ex. 8 | (E-I) 29 | 71 | 1 | 32 | 510 | 12 | 760 | 24000 | 94.1 | 5 | 585 |
| Ex. 9 | (E-II) 29 | 71 | 1 | 37 | 515 | 14 | 770 | 24400 | 94.2 | 5 | 580 |
| Ex. 10 | (E-III) 29 | 71 | 1 | 32 | 502 | 16 | 745 | 23800 | 93.9 | 5 | 590 |
| Ex. 11 | (E-IV) 23 | 77 | 1 | 34 | 512 | 17 | 764 | 24100 | 94.3 | 4 | 575 |
| Ex. 12 | (E-V) 29 | 71 | 1 | 36 | 516 | 18 | 772 | 24500 | 94.0 | 5 | 575 |
| Ex. 13 | (E-VI) 29 | 71 | 1 | 35 | 505 | 15 | 753 | 23900 | 93.8 | 5 | 590 |
| Ex. 14 | (E-VII) 25 | 75 | 1 | 39 | 508 | 14 | 755 | 24000 | 94.2 | 5 | 575 |
| Ex. 15 | (E-I) 39 | 61 | 1 | 48 | 424 | 29 | 536 | 20000 | 92.8 | 4 | 570 |
| Com. Ex. 4 | (C-I) 37 | 63 | 1 | 22 | 515 | 14 | 752 | 23900 | 94.3 | 2 | 565 |
| Com. Ex. 5 | (C-II) 29 | 71 | 1 | 16 | 501 | 8 | 740 | 23600 | 93.8 | 1 | 570 |
| Com. Ex. 6 | (C-III) 29 | 71 | 1 | 24 | 511 | 12 | 757 | 23800 | 94.1 | 2 | 575 |
| Com. Ex. 7 | (C-III) 39 | 61 | 1 | 31 | 413 | 18 | 510 | 19400 | 91.5 | 1 | 560 |

(Note)
*1Ethylenebisstearylamide

From the results shown in Table 4, it is understood that the styrene resin compositions obtained in Examples 8 to 15 according to the present invention are all excellent in impact resistance, tensile strength, tensile elongation, flexural strength, flexural elasticity, heat resistance, surface appearance and fluidity, particularly in impact resistance and surface appearance.

EXAMPLES 16 TO 20 AND COMPARATIVE EXAMPLES 8 TO 12

The rubber-containing resin composition (E-I) or (C-III) obtained in Example 1 or Comparative Example 3, a styrene resin as shown below and 1 part by weight of ethylenebisstearylamide per 100 parts by weight of the total of the resins were charged into a blender and mixed at room temperature to give a uniform mixture. In Example 18 and Comparative Example 10, 2 parts by weight of dioctyl tin maleate was used as a stabilizer.

The obtained mixture was placed in a 40 mm single screw extruder and extruded at 180° C. in Example 18 and Comparative Example 10 and at 260° C. in Examples 16–17 and 19–20 and Comparative Examples 8–9 and 11–12 to pellets of a rubber-modified styrene resin alloy having a size of 2 mm diameter and 5 mm length.

Also, the obtained rubber-modified styrene resin alloy was supplied to an injection molding machine (model FAS100B made by Fanuc Kabushiki Kaisha) and molded at a cylinder temperature of 190 ° C. in Example 18 and Comparative Example 10 and at a cylinder temperature of 250° C. in Examples 16–17 and 19–20 and Comparative Examples 8–9 and 11–12 to give test specimens (ASTM standard size).

The physical properties of the rubbber-modified styrene resin alloys were evaluated using the obtained pellets and test specimens.

The results are shown in Table 5.

(Styrene resins used)
STA: Acrylonitrile-α-methylstyrene copolymer (acrylonitrile content 30% by weight, α-methylstyrene content 70% weight, Mw 120,000) in the form of pellets
STB: Acrylonitrile-N-phenylmaleimide-styrene copolymer (acrylonitrile content 17% by weight, N-phenylmaleimide content 20% by weight, styrene content 63% by weight, Mw 120,000) in the form of pellets
STC: Mixture of 37 parts by weight of acrylonitrile-styrene copolymer (acrylonitrile content 30% by weight, styrene content 70% weight, Mw 150,000) in the form of pellets and 63 parts by weight of polyvinyl chloride (degree of polymerization 600) in the form of powder
STD: Mixture of 37 parts by weight of acrylonitrile-styrene copolymer (acrylonitrile content 30% by weight, styrene content 70% weight, Mw 150,000) in the form of pellets and 63 parts by weight of bisphenol A type polycarbonate (Mw 23,000) in the form of pellets
STD: Mixture of 37 parts by weight of acrylonitrile-styrene copolymer (acrylonitrile content 30% by weight, styrene content 70% weight, Mw 150,000) in the form of pellets and 63 parts by weight of nylon 6 in the form of pellets

TABLE 5

| | Composition of styrene resin composition (part by weight) | | | | Property of stryene resin composition | | | | | | | |
|---|---|---|---|---|---|---|---|---|---|---|---|---|
| | Rubber-containing resin composition | | Styrene resin | | Impact resistance (kg · cm/cm) | Tensile strength (kg/cm$^2$) | Elongation (%) | Flexural strength (kg/cm$^2$) | Flexural elasticity (kg/cm$^2$) | Heat resistance (° C.) | Surface appearance | Fluidity (mm) |
| Ex. 16 | (E-I) | 29 | STA | 71 | 12 | 510 | 13 | 800 | 25500 | 114 | 5 | 440 |
| Ex. 17 | (E-I) | 29 | STB | 71 | 13 | 500 | 11 | 760 | 25100 | 109 | 5 | 630 |
| Ex. 18 | (E-I) | 20 | STC | 80 | 42 | 480 | 28 | 640 | 21200 | 72 | 5 | 520 |
| Ex. 19 | (E-I) | 26 | STD | 80 | 34 | 550 | 60 | 790 | 25000 | 108 | 4 | 420 |
| Ex. 20 | (E-I) | 20 | STE | 80 | 15 | 540 | 70 | 810 | 24500 | 102 | 5 | 630 |
| Com. Ex. 8 | (C-III) | 29 | STA | 71 | 6 | 490 | 7 | 780 | 25000 | 113 | 1 | 450 |
| Com. Ex. 9 | (C-III) | 29 | STB | 71 | 5 | 480 | 6 | 740 | 24800 | 108 | 3 | 630 |
| Com. Ex. 10 | (C-III) | 20 | STC | 80 | 21 | 460 | 18 | 630 | 21000 | 73 | 1 | 530 |
| Com. Ex. 11 | (C-III) | 20 | STD | 80 | 18 | 520 | 46 | 780 | 25000 | 109 | 1 | 430 |
| Com. Ex. 12 | (C-III) | 20 | STE | 80 | 8 | 520 | 53 | 800 | 24000 | 101 | 2 | 630 |

From the results shown in Table 5, it is understood that the rubber-modified styrene resin composition obtained in Examples 16 to 20 according to the present invention are all excellent in impact resistance, tensile strength, tensile elongation, flexural strength, flexural elasticity, heat resistance, surface appearance and fluidity, particularly in impact resistance and surface appearance.

Thus, the rubber-modified styrene resins and rubber-modified styrene resin alloys obtained by using the rubber-containing resin composition of the present invention provide molded articles having excellent properties such as tensile strength, tensile elongation, heat resistance, processability and the like, particularly improved impact resistance and surface appearance.

What we claim is:

1. A rubber-containing resin composition comprising:
(A) a graft copolymer having a graft ratio of 15 to 80% by weight wherein a graft component (Ag) comprising 15 to 60% by mole of at least one vinyl cyanide monomer, 40 to 85% by mole of at least one aromatic vinyl compound monomer and 0 to 30% by mole of at least one other monomer copolymerizable with said vinyl cyanide monomer and said aromatic vinyl compound monomer is graft-copolymerized onto a diene rubber (Ad) having a volume average particle size of 100 to 1,000 nm by an emulsion polymerization method, and
(B) an emulsion-polymerized copolymer of 15 to 60% by mole of at least one vinyl cyanide monomer, 40 to 85% by mole of at least one aromatic vinyl compound monomer and 0 to 30% by mole of at least one other monomer copolymerizable with said vinyl cyanide monomer and said aromatic vinyl compound monomer constituting copolymer (B), which has a weight average molecular weight (Mw) of 5,000 to 90,000 and an Mw/Mn ratio of weight average molecular weight (Mw) to number average molecular weight (Mn) of 1.5 to 4.5, in which the ratio of said graft copolymer (A) to said copolymer (B) is from 50/50 to 95/5 by weight and said rubber-containing resin composition has a content of diene rubber (Ad) of 55.5 to 85% by weight, and wherein the vinyl cyanide monomer, aromatic vinyl compound monomer and other monomer constituting copolymer (B) may be the same as, or different from, the vinyl cyanide monomer, aromatic vinyl compound monomer and other monomer constituting component (Ag).

2. The composition of claim 1, which is obtained by uniformly mixing a latex of said graft copolymer (A) and a latex of said copolymer (B) in an (A)/(B) ratio of 55/45 to 95/5 by weight followed by recovery in the form of a powder.

3. The composition of claim 1, wherein said diene rubber (Ad) has an increased particle size obtained by agglomerating particles of a rubber of unenhanced particle size in an aqueous latex by means of the addition of (C) an aqueous latex of an acid group-containing copolymer prepared by copolymerizing (c) 5 to 50% by weight of at least one unsaturated carboxylic acid selected from the group consisting of acrylic acid, methacrylic acid, itaconic acid and crotonic acid, (d) 50 to 95% by weight of at least one alkyl (meth)acrylate having a $C_1$ to $C_{12}$ alkyl group and (e) 0 to 40% by weight of at least one monomer copolymerizable with said monomers (c) and (d).

4. The composition of claim 1, wherein said diene rubber (Ad) has an increased particle size obtained by agglomerating particles of a rubber of unenhanced particle size in an aqueous latex by means of the addition of (C) an aqueous latex of an acid group-containing copolymer prepared by copolymerizing (c) 5 to 25% by weight of at least one unsaturated carboxylic acid selected from the group consisting of acrylic acid, methacrylic acid, itaconic acid and crotonic acid, (d-1) 5 to 30% by weight of at least one alkyl acrylate having a $C_1$ to $C_{12}$ alkyl group, (d-2) 20 to 90% by weight of at least one alkyl methacrylate having a $C_1$ to $C_{12}$ alkyl group, and (e) 0 to 40% by weight of at least one monomer copolymerizable with said monomers (c), (d-1) and (d-2), wherein said monomer (e) is at least one selected from the group consisting of an aromatic vinyl compound, a vinyl cyanide compound and a compound having at least two polymerizable groups in its molecule.

5. A rubber-modified styrene resin composition comprising the rubber-containing resin composition of claim 1, and at least one styrene resin selected from the group consisting of a styrene homopolymer, a styrene copolymer and a styrene resin alloy composed of a styrene copolymer and other thermoplastic resin.

6. A rubber-modified styrene resin composition comprising the rubber-containing resin composition of claim 3, and at least one styrene resin selected from the group consisting of a styrene homopolymer, a styrene copolymer and a styrene resin alloy composed of a styrene copolymer and other thermoplastic resin.

7. A rubber-modified styrene resin composition comprising the rubber-containing resin composition of claim 1, and at least one styrene copolymer.

8. A rubber-modified styrene resin composition comprising the rubber-containing resin composition of claim 3, and at least one styrene copolymer.

9. A rubber-modified styrene resin composition comprising the rubber-containing resin composition of claim 1, at least one styrene copolymer and at least one vinyl chloride polymer.

10. A rubber-modified styrene resin composition comprising the rubber-containing resin composition of claim 3, at least one styrene copolymer and at least one vinyl chloride polymer.

11. A rubber-modified styrene resin composition comprising the rubber-containing resin composition of claim 1, at least one styrene copolymer and at least one polycarbonate.

12. A rubber-modified styrene resin composition comprising the rubber-containing resin composition of claim 3, at least one styrene copolymer and at least one polycarbonate.

13. A rubber-modified styrene resin composition comprising the rubber-containing resin composition of claim 1, at least one styrene copolymer and at least one polyamide.

14. A rubber-modified styrene resin composition comprising the rubber-containing resin composition of claim 3, at least one styrene copolymer and at least one polyamide.

15. The composition of claim 1, wherein said diene rubber (Ad) is a particle size enhanced diene rubber obtained by agglomerating particles of a rubber of unenhanced particle size in an aqueous latex by means of the addition of (C) an aqueous latex of an acid group-containing copolymer prepared by copolymerizing (c) 5 to 25% by weight of at least one unsaturated carboxylic acid selected from the group consisting of acrylic acid, methacrylic acid, itaconic acid and crotonic acid, (d-1) 5 to 30% by weight of at least one alkyl acrylate having a $C_1$ to $C_{12}$ alkyl group, (d-2) 45 to 90% by weight of at least one alkyl methacrylate having a $C_1$ to $C_{12}$ alkyl group, and (e) 0 to 20% by weight of at least one monomer copolymerizable with said monomers (c), (d-1) and (d-2), wherein said monomer (e) is at least one selected from the group consisting of an aromatic vinyl compound, a vinyl cyanide compound and a compound having at least two polymerizable groups in its molecule.

16. A rubber-containing resin composition consisting of:
(A) a graft copolymer having a graft ratio of 15 to 80% by weight wherein a graft component (Ag) comprising 15 to 60% by mole of at least one vinyl cyanide monomer, 40 to 85% by mole of at least one aromatic vinyl compound monomer and 0 to 30% by mole of at least one other monomer copolymerizable with said vinyl cyanide monomer and said aromatic vinyl compound monomer is graft-copolymerized onto a diene rubber (Ad) having a volume average particle size of 100 to 1,000 nm by an emulsion polymerization method, and
(B) an emulsion-polymerized copolymer of 15 to 60% by mole of at least one vinyl cyanide monomer, 40 to 85% by mole of at least one aromatic vinyl compound monomer and 0 to 30% by mole of at least one other monomer copolymerizable with said vinyl cyanide monomer and said aromatic vinyl compound monomer constituting copolymer (B), which has a weight average molecular weight (Mw) of 5,000 to 90,000 and an Mw/Mn ratio of weight average molecular weight (Mw) to number average molecular weight (Mn) of 1.5 to 4.5, in which the ratio of said graft copolymer (A) to said copolymer (B) is from 50/50 to 95/5 by weight and said rubber-containing resin composition has a content of diene rubber (Ad) of 55.5 to 85% by weight, and wherein the vinyl cyanide monomer, aromatic vinyl compound monomer and other monomer constituting copolymer (B) may be the same as, or different from, the vinyl cyanide monomer, aromatic vinyl compound monomer and other monomer constituting component (Ag).

17. A rubber-containing resin composition comprising:
(A) a graft copolymer having a graft ratio of 10 to 80% by weight wherein a graft component (Ag) comprising 15 to 60% by mole of at least one vinyl cyanide monomer, 40 to 85% by mole of at least one aromatic vinyl compound monomer and 0 to 30% by mole of at least one other monomer copolymerizable with said vinyl cyanide monomer and said aromatic vinyl compound monomer is graft-copolymerized onto a diene rubber (Ad) having a volume average particle size of 100 to 1,000 nm by an emulsion polymerization method, and
(B) an emulsion-polymerized copolymer of 15 to 60% by mole of at least one vinyl cyanide monomer, 40 to 85% by mole of at least one aromatic vinyl compound monomer and 0 to 30% by mole of at least one other monomer copolymerizable with said vinyl cyanide monomer and said aromatic vinyl compound monomer constituting copolymer (B), which has a weight average molecular weight (Mw) of 5,000 to 90,000 and an Mw/Mn ratio of weight average molecular weight (Mw) to number average molecular weight (Mn) of 1.5 to 4.5, in which the ratio of said graft copolymer (A) to said copolymer (B) is from 50/50 to 95/5 by weight, and wherein the vinyl cyanide monomer, aromatic vinyl compound monomer and other monomer constituting copolymer (B) may be the same as, or different from, the vinyl cyanide monomer, aromatic vinyl compound monomer and other monomer constituting component (Ag), the content of said diene rubber (Ad) in said rubber-containing resin composition is from 40 to 85% by weight, and said diene rubber (Ad) is a particle size enhanced diene rubber obtained by agglomerating particles of a rubber of unenhanced particle size in an aqueous latex by means of the addition of (C) an aqueous latex of an acid group-containing copolymer prepared by copolymerizing (c) 5 to 50% by weight of at least one unsaturated carboxylic acid selected from the group consisting of acrylic acid, methacrylic acid, itaconic acid and crotonic acid, (d) 50 to 95% by weight of at least one alkyl (meth)acrylate having a $C_1$ to $C_{12}$ alkyl group and (e) 0 to 40% by weight of at least one monomer copolymerizable with said monomers (c) and (d).

18. The composition of claim 17, wherein said latex (C) is an aqueous latex of an acid group-containing copolymer prepared by copolymerizing (c) 5 to 25% by weight of at least one unsaturated carboxylic acid selected from the group consisting of acrylic acid, methacrylic acid, itaconic acid and crotonic acid, (d-1) 5 to 30% by weight of at least one alkyl acrylate having a $C_1$ to $C_{12}$ alkyl group, (d-2) 20 to 90% by weight of at least one alkyl methacrylate having a $C_1$ to $C_{12}$ alkyl group, and (e) 0 to 40% by weight of at least one monomer copolymerizable with said monomers (c), (d-1) and (d-2), wherein said monomer (e) is at least one selected from the group consisting of an aromatic vinyl compound, a vinyl cyanide compound and a compound having at least two polymerizable groups in its molecule.

19. The composition of claim 17, wherein said latex (C) is an aqueous latex of an acid group-containing copolymer prepared by copolymerizing (c) 5 to 25% by weight of at least one unsaturated carboxylic acid selected from the group consisting of acrylic acid, methacrylic acid, itaconic acid and crotonic acid, (d-1) 5 to 30% by weight of at least one alkyl acrylate having a $C_1$ to $C_{12}$ alkyl group, (d-2) 45 to 90% by weight of at least one alkyl methacrylate having a $C_1$ to $C_{12}$ alkyl group, and (e) 0 to 20% by weight of at least one monomer copolymerizable with said monomers (c), (d-1) and (d-2), wherein said monomer (e) is at least one selected from the group consisting of an aromatic vinyl compound, a vinyl cyanide compound and a compound having at least two polymerizable groups in its molecule.

20. The composition of claim 19, wherein the content of diene rubber (Ad) in the composition is from 55.5 to 85% by weight.

21. A rubber-modified styrene resin composition comprising the rubber-containing resin composition of claim 17, and at least one styrene resin selected from the group consisting of a styrene homopolymer, a styrene copolymer and a styrene resin alloy composed of a styrene copolymer and other thermoplastic resin.

22. A rubber-modified styrene resin composition comprising the rubber-containing resin composition of claim 17, at least one styrene copolymer and at least one vinyl chloride polymer.

23. A rubber-modified styrene resin composition comprising the rubber-containing resin composition of claim 17, at least one styrene copolymer and at least one polycarbonate.

24. A rubber-modified styrene resin composition comprising the rubber-containing resin composition of claim 17, at least one styrene copolymer and at least one polyamide.

* * * * *